March 2, 1971   T. M. SMITH   3,566,719
"NO TOOL" DETECTION SYSTEM AND METHOD
Filed Nov. 5, 1968

INVENTOR
THEODORE M. SMITH
BY *Cullen, Sloman, & Cantor*
ATTORNEYS

United States Patent Office 3,566,719
Patented Mar. 2, 1971

3,566,719
"NO TOOL" DETECTION SYSTEM AND METHOD
Theodore M. Smith, 14750 Puritan Ave.,
Detroit, Mich. 48227
Filed Nov. 5, 1968, Ser. No. 773,541
Int. Cl. B23b 47/00; B23q 11/00
U.S. Cl. 77—5                                10 Claims

ABSTRACT OF THE DISCLOSURE

A "no tool," "broken tool" or "improperly set tool" detection device for use with taps, drills, reamers, boring tools, counter bores and milling cutters which includes a tool holder having assembled first and second parts normally biased outwardly of each other, with a radioactive element on one part and a shield upon the other part normally spaced from the radioactive element, and in conjunction with a radiation detection system whereby upon compressive engagement of the tool with a workpiece due to its longitudinal feed, there will be a relative movement of the tool holder parts such as will position said shield to protectively enclose said radiation element, said relative movement being prevented when there is "no tool," a "broken tool" or an "improperly set tool"; and the method of providing said detection system.

BACKGROUND OF THE INVENTION

In applicant's earlier issued United States Pat. 3,381,-550, dated May 7, 1968, and entitled, "Apparatus for a Tool Failure Detection System," there was provided a compensating type of tool holder including a pair of relatively movable parts. In that construction, a radioactive element was mounted upon one of the relatively movable parts, and a shielding device normally covering the radioactive element was mounted upon the other of the relatively moveable tool holder parts. In that disclosure a failure of contemplated function of the tool in the machine tool is adapted to cause a relative movement between the parts such as would uncover the radioactive element for the purpose of activating a radiation detection system for avoiding damage to a workpiece to give an audible signal or the like. That construction was designed to prevent damage to workpieces on a production line which might not otherwise be discovered until after a complete machining operation with consequent loss and expense if repairs could be made.

In accordance with the present invention, the same principle may be employed in an apparatus and in a method by which an automatic means may be provided for the detection of "no tool," a "broken tool" or an "improperly set tool" for taps, drills, reamers, boring tools, counter bores and milling cutters to thus give an instantaneous signal by which the machine tool or production line may be shut down until a proper tool has been provided.

It is therefore a primary object of the present invention to provide a compensating type of two part tool holder whereby upon the existence of either "no tool," a "broken tool" or an "improperly set tool" after a predetermined feed movement of the tool holder with respect to the workpiece, the radioactive element will remain exposed due to lack of relative movement of the tool holder parts such as would normally be caused by engagement of a properly set tool with respect to the workpiece with the result that the control mechanism may be activated automatically for shutting down the equipment.

It is another object of the present invention to provide an improved method by which the existence of "no tool," a "broken tool" or an "improperly set tool" may be immediately detected in automatic manner for shutting down equipment to permit adjustment or replacement of the tool in question.

It is a further object to incorporate in the present system and in conjunction with such compensating tool holder, an electrical circuit which includes a radiation detection system which circuit is normally closed and incorporating a limit switch or the like which is mechanically opened upon such normal feed movement of the tool holder which with a normal tool properly set would otherwise compressively engage the workpiece so that relative movement of the workpiece holder parts would cause a shielding of the radioactive element.

These and other objects will be seen from the following specification and claims in conjunction with the appended drawing in which:

DETAILED DESCRIPTION

Figure 1:
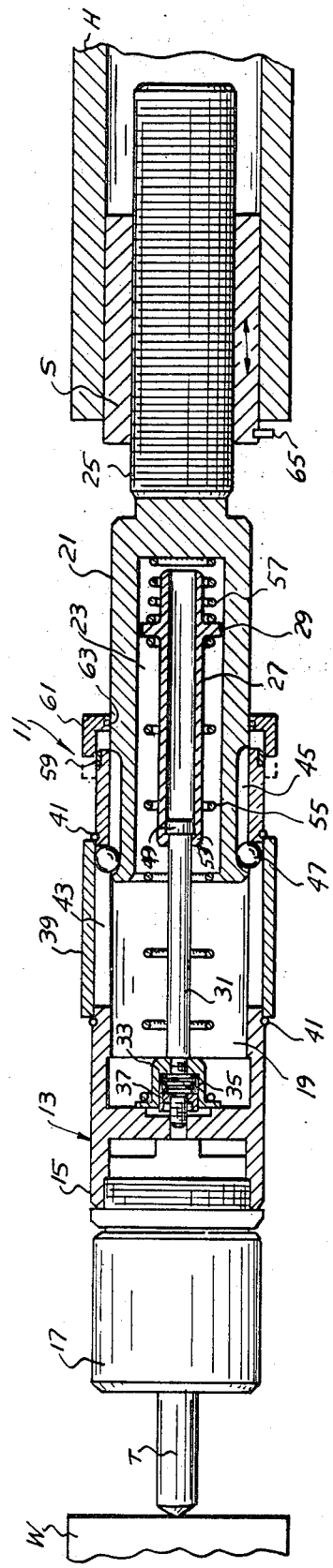
FIG. 1 is a longitudinal section of the present tool holder detection device with the power and feed spindle and head fragmentarily shown.

The present "no tool," "broken tool" or "improperly set tool" detection system generally indicated at 11, FIG. 1, in the illustrative embodiment includes a compensating tap holder 13 having a body or first part 15 mounting at one end a tool adapter assembly 17 for mounting the tap T or other tool such as a drill, a reamer, a boring tool, a counter bore or a milling cutter. Such tool is adapted for operative machining engagement with respect to the workpiece W fragmentarily shown in FIG. 1 which workpiece could be a part to be drilled or tapped such as an engine block for illustration.

Within the elongated bore 19 of first part 15 there is movably nested a second part 21 having an elongated internal bore 23 which terminates at one end in the shank 25 adapted for positioning within a conventional spindle journalled and driven within a head H fragmentarily shown, in a conventional manner.

It is contemplated that in some machine tools in addition to a rotative drive of the spindle S in both directions that there will be provided a longitudinal feed. This feed may be in the spindle itself or may be provided by the head for the purpose of imparting a longitudinal feed as well as rotative power to the tool holder assembly 13. Elongated spring seat bushing 27 is loosely nested within the bore of second part 21 and includes an annular flange 29 intermediate its ends loosely engaging said bore.

Elongated bolt 31 at one end is secured to the spring seat nut 33, the latter including an annular flange as shown in FIG. 1. Said nut houses an axially positioned centering spring 35 engaged by retaining washer 37 which is centered with respect to the bore of the tool holder of first part 15. A set of angularly spaced transverse slots 43 are formed through the wall of first part 15 intermediate its ends adapted to receive the balls 47. Ball cage 39 of cylindrical form is journalled around first part 15 and retained in the position shown in FIG. 1 by the spaced locking rings 41.

Upon the exterior surface of the second part 21 there provided a corresponding set of elongated ball receiving grooves 45 by which in a conventional manner rotative driving forces from the spindle and from the shank 25 may be transmitted from the second part to the first part 15 carrying the tool T.

The enlarged head 49 is slidably positioned within spring seat bushing 27 for centering and for guiding the same for relative movements inwardly from the position shown in FIG. 1. One end of said bushing includes an internal flange or stop 53 engageable with head 49 for limiting relative outward movement only of said bushing and for assuring that the opposite end of the said bushing is normally spaced from the tool holder second part 21. The elongated coil spring 55 extends through the bores 19 and 23 at one end extends around spring seat bushing 27 and bears against the flange 29. Its opposite end engages in compression the flange upon the spring seat nut 33 for normally urging the first part 15 and the corresponding bushing 27 to the outermost position shown as limited by the head 49. The said spring 55 is interposed in compression between said first part and the flange 29.

A cocking spring 57 is positioned around a portion of the bushing 27 and interposed in compression between the second part and the spring stop bushing flange 29.

The radioactive ring 59 or metallic ring impregnated with a radioactive substance is fixed upon tool holder first part 15. Mounted upon the tool holder second part 21 is an annular shield 61 whose central web is apertured to receive second part 21 which it frictionally engages by virtue of the friction ring 63. The said shield in normal operation of the present invention is spaced from the radioactive element 59.

Figure 2:
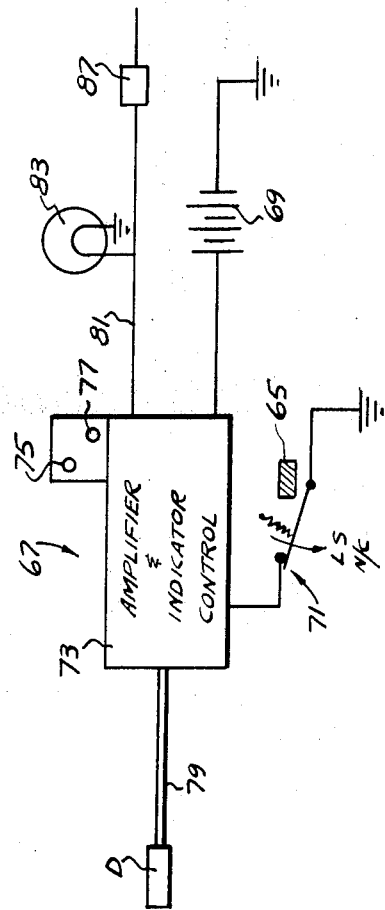
FIG. 2 is a schematic diagram of the electrical circuit of the radiation detection system.

The rays normally emitted from the radioactive element or ring 59 in accordance with the present invention are adapted to activate a radiation detector such as shown schematically in the diagram FIG. 2.

The present detection system 67 includes a detector D of the Geiger tube type which is adapted to sense radioactive rays when emitted from element 59 on the tool holder under certain conditions.

In the circuit shown in FIG. 2 an electrical amplifier 73 is biased by normally closed limit switch 71 to ground. Amplifier and indicator control assembly 73 is connected to detector D by lead wires 79, and also to power source 69.

The radiation detection system includes "off" and "on" switch 75, reset button 77 and the lead 81 to the signal device 83 which may be a bulb or a light or an audible signal. In the same circuit series therewith there is schematically shown a control element 87 which when energized may be adapted to either shut down the machine tool or to effect a withdrawal of the tool holder to an inoperative position.

The present Geiger tube type of detector senses the exposure of the radioactive element 59 whenever there is a failure of relative longitudinal movement between the tool holder parts 15 and 21 with respect to the workpiece W.

The increase in detector count rays causes the electronic circuitry to deflect a meter relay in the direction system generally indicated at 67 which may include, as shown in FIG. 2 schematically, an amplifier and an indicator control 73, i.e., in an electrical circuit which forms no part of the present invention, for activation of the alarm relay assembly in turn energizing the alarm light 83 or other audible signal and or the control mechanism 87. This illustrates one means or circuit by which the present detection system functions.

The electronic parts such as generally designated at 67 with the type of circuitry shown in FIG. 2 are provided and sold by Eberline Instrument Company and others. The circuitry and construction of the detection system form no part of the present method or apparatus but are merely illustrative of one such detection system.

In the illustrative embodiment the sealed source of radioactive radiation material should be such that one quarter of an inch for illustration of the metal shield or other equivalent shield will give an alternation of approximately 1,000.

There is thus employed in connection with the radioactive element 59 beta radiation or low energy gamma radiation. Sources of these may be as follows:

Strontium-90        Thallium-204
Cerium-144          Radium-D
Krypton-185         Radium-E This is by way of illustration only and not limitation, since it is contemplated that other nuclides may be suitable for this purpose in the low energy range. The present method provides for the use of radioactive isotopes in the form of the radioactive element or ring 59 applied to one of the parts of the compensating tool holder and wherein upon the existence of "no tool," a "broken tool" or an "improperly set tool" the normal relative movement of the parts which would cause shielding of the radioactive element is prevented with the result that the emitted rays from the radiating element are available to activate the radiation detection 67 provided the same has been energized.

In the present set up as the tool holder is activated and before contact normally of the tool with the workpiece parts are so arranged that radioactive element is unshielded. During this period however a circuit which includes the radiation detector is open noting the limit switch 71 which is normally closed. It is only after such longitudinal feed of the spindle S or head H as would normally place a properly set tool T in engagement with the workpiece that such feed movement causes stop 65 FIG. 1 upon the spindle as, FIG. 2, to open limit switch 71 to activate the radiation detection circuit. At that time however if the workpiece has been properly engaged by the tool T, there will be a compressive movement of the tool holder parts 15 and 21 with the result that the shield has moved so as to enclose radioactive element 59. Thus under those conditions, signal mechanism 83–87 would not be activated. This is the normal situation. At the end of a boring or tapping operation, the work holder assembly is withdrawn due to the function of the spindle and or the head. Just as soon as contact member 65 moves away from limit switch 71, the electronic circuit to the radiation detection device is closed or grounded and inhibits the detection system.

Upon initial inward feeding of holder elements 15–21 with respect to the workpiece, and assuming a proper tool is in place, compressive engagement and continued feed against the workpiece by the tool will cause a relative telescoping or movement of the first and second parts so that the second part 21 moves inwardly some distance with respect to the first part 15 causing compression of springs 55 and 57.

Accordingly when the holder backs off and is withdrawn so that the tool is out of contact with the workpiece the primary function is for the cocking spring 57 to then expand causing a relatively outward movement of the tool holder parts 15 and 21, such that the shield moves so as to no longer enclose the radioactive element. Of course, at this time, such withdrawal movement of the spindle has closed the limit switch 71 so that the radiation detection system is inoperative.

The present method includes the following steps:

(1) Mounting the first and second parts 15–21 for longitudinal movement in unison relative to workpiece W and for longitudinal movement of the second part 21 relative to the first part 15 upon operative engagement of the tool T with the workpiece W.

(2) Mounting a normally unshielded radioactive element 59 upon said first part; movement of said second part relative to the first part shielding said radioactive element.

(3) Energizing a radiation detection system after such feed movement of said first and second parts as would normally bring the tool into engagement with said workpiece; the rays of said radioactive element being adapted to activate said radiation detection system when "no tool," a "broken tool" or an "improperly set tool" prevents contact of the tool with the workpiece.

There is incorporated the intermediate or additional step that the radiation detection system circuit is normally inhibited and closed and it is only after such initial feed movement of the first and second parts as to bring a normal tool into engagement with workpiece, that the circuit is opened and the detection system 67 ready to receive any rays from the radioactive element 59.

Of course, if a proper tool and a properly set tool is in place for a compressive contact of the tool T with the work, it will cause an immediate relative movement of part 21 with respective part 15 so that the shield encloses the radioactive element 59 and prevents a signal. Thus, with no tool present, or a broken tool or an improperly set tool, when the spindle or head has caused such longitudinal feed movement a distance which would normally bring a properly set tool into engagement with a workpiece, it is seen that the contemplated relative movement of the parts 15 and 21 is prevented with the result that the radioactive element 59 now activates the radiation detection system 67. This can activate an audible or visible signal as at 83 and can also through the element 87 operate controls for either stopping the feed movement of the head, reversing the feed movement and at the same time reversing the drive on the spindle or to automatically shut down the equipment to prevent damage to the workpiece and for the purpose of replacing or properly setting the tool.

The radioactive element 59 normally beta radiation or a low energy gamma radiation or may consist of any byproduct material with atomic members in any range. The proposed radioactive element contains approximately or up to 500 microcuries for illustration.

While the shield 61 is mounted upon the second part 21 the relative position between the shield and radioactive element could be reversed.

Having described my invention, reference should now be had to the following claims.

I claim:

1. The method of providing a "no tool," a "broken tool" or an "improperly set tool," detection system for taps, drills, reamers, boring tools, counter bores and milling cutters, including a first part mounting a tool adapted to engage a workpiece and a relatively movable second part connecting the first part to a source of rotative power and longitudinal feed; the steps of:
   mounting said first and second parts for longitudinal movement in unison relative to said workpiece and for longitudinal movement of the second part relative to the first part upon operative engagement of the tool with a workpiece;
   mounting a normally unshielded radioactive element upon said first part;
   said movement of said second part relative to the first part shielding said radioactive element;
   longitudinally feeding said first and second parts in unison toward the workpiece;
   energizing a radiation detection system after such feed movement of said first and second parts as would normally bring the tool into engagement with said workpiece and cause relative movement between said first and second parts;
   activating said radiation detection system by said unshielded radioactive element when no tool, a broken tool or an improperly set tool prevents contact of the tool with the workpiece.

2. In a "no tool," broken tool" or "improperly set tool," detection device for use with taps, drills, reamers, boring tools, counter bores and milling cutters;
   a first part having a bore and mounting a tool adapted to operatively engage a workpiece;
   a second part having a bore and having a shank adapted for connection to a source of rotative power and longitudinal feed;
   means mounting the second part within the bore of the first part for operative driving engagement therewith and for longitudinal movement relatively thereto on engagement of said tool with a workpiece;
   a radioactive impregnated element mounted upon one of said parts;
   and a shield mounted upon the other of said parts, normally spaced from said radioactive element so as to leave said radioactive element unshielded;
   relative movement between said parts moving said shield to cover and enclose said radioactive element on engagement of said tool with a workpiece;
   the rays from said unshielded radioactive element adapted to energize a radiation detection system upon failure of said relative longitudinal movement between said parts due to the existence of "no tool," "a broken tool" or an "improperly set tool."

3. In the detection device of claim 2, a circuit including said radiation detection system;
   and a normally closed switch in said circuit mechanically opened upon such longitudinal feed movement of said second part as would bring a properly set tool into contact with said work piece.

4. In the detection device of claim 2, a coiled spring extending through said bores and interposed in compression between said first and second parts.

5. In the detection device of claim 2, an elongated spring seat bushing within and coaxial of said second part including an annular flange intermediate its ends;
   a coiled spring receiving said bushing and interposed in compression between said first part and said flange;
   and a cocking spring coaxial with and receiving said bushing and interposed in compression between said flange and said second part;
   retraction of said longitudinal feed and disengagement of said tool and workpiece permitting relative movement between first and second parts in the opposite direction for spacing said shield from said radioactive element.

6. In the detection device of claim 3, an elongated spring seat bushing within and coaxial of said second part including an annular flange intermediate its ends;
   a coiled spring receiving said bushing and interposed in compression between said first part and said flange;
   and a coiled spring coaxial with and receiving said bushing and interposed in compression between said flange and said second part;
   retraction of said longitudinal feed and disengagement of said tool and workpiece mechanically opening said circuit switch and permitting relative movement between said first and second parts in the opposite direction for spacing said shield from said radioactive element.

7. In the detection device of claim 5, a spring seat nut centered upon and bearing against said first part upon its interior and including an annular flange adapted to receive one end of said compression spring;
   and a headed bolt, at its end secured to said nut, with its head axially slidable within said bushing;
   said bushing having an internal annular flange at one end engageable with said head for limiting relative outward movement of said bushing relative to said first part and spacing said bushing from said second part.

8. In the detection device of claim 2, said radioactive element being selected from the group consisting of beta radiation and low energy gamma radiation.

9. In the detection device of claim 2, the radioactive element being selected from the group consisting of Strontium-90, Cerium-144, Krypton-185, Thallium-204, Radium D and Radium E.

10. In the detection device of claim 2, said radioactive element being in the form of a ring mounted on one part;

said shield being in the form of a flanged collar of increased internal diameter mounted upon the other part.

References Cited

UNITED STATES PATENTS 3,381,550  5/1968  Smith _____ 77—5

FRANCIS S. HUSAR, Primary Examiner

U.S. Cl. X.R.

10—129; 90—11; 250—83, 106